United States Patent
Yount

(10) Patent No.: US 6,793,737 B2
(45) Date of Patent: Sep. 21, 2004

(54) PROCESS FOR REMOVING A RESINOUS COATING FROM FIBEROUS PRODUCTS

(75) Inventor: John W. Yount, Oxford, NC (US)

(73) Assignees: Owens Corning Fiberglas Technology, Inc., Summit, IL (US); J W Yount Fiberglass Reclaimers Corporation, Oxford, NC (US)

( * ) Notice: Subject to any disclaimer, the term of this patent is extended or adjusted under 35 U.S.C. 154(b) by 0 days.

(21) Appl. No.: 09/950,033

(22) Filed: Sep. 10, 2001

(65) Prior Publication Data
US 2003/0047193 A1 Mar. 13, 2003

(51) Int. Cl.[7] .............................. B08B 3/04; B08B 3/10
(52) U.S. Cl. ............................. 134/3; 134/13; 134/18; 134/19; 134/26; 134/28; 134/38; 134/42
(58) Field of Search ................................ 134/3, 13, 18, 134/19, 26, 28, 38, 42

(56) References Cited

U.S. PATENT DOCUMENTS 4,300,955 A  11/1981  Yount
RE36,389 E * 11/1999  Al-Jumah et al. ............ 134/42
6,251,224 B1  6/2001  Dong
6,454,873 B1  9/2002  Mulligan et al.

* cited by examiner

Primary Examiner—Zeinab El-Arini
(74) Attorney, Agent, or Firm—Inger H. Eckert; James J. Dottavio

(57) ABSTRACT

A method for reclaiming fiberglass and a resinous residue from resinous fiberglass product. The method comprises first introducing the resinous fiberglass product to a single chamber or multi-chamber washer/extractor machine. An aqueous acid solution is then used to remove the resinous residue from the resinous fiberglass product. The fiberglass portion is then rinsed, dewatered, and stored for later use. At the same time, the resinous residue is recovered by precipitating the resinous residue out of the acid solution bath and separating it using a clarifier. The fiberglass portion is then available for reuse in the glass industry and other end use applications and the resinous residue may then be available for use in many other industries, including the fertilizer industry. In an alternative embodiment, a sizing composition may also be applied to the fiberglass portion prior to the dewatering step to form a sized fiberglass material.

25 Claims, 2 Drawing Sheets

PROCESS FOR REMOVING A RESINOUS COATING FROM FIBEROUS PRODUCTS

TECHNICAL FIELD AND INDUSTRIAL APPLICABILITY OF THE INVENTION

The present invention relates generally to reclaiming processes and more particularly to the process of removing resinous coatings from fibrous products and reclaiming the nitrogenous by-product.

BACKGROUND OF THE INVENTION

Resin treated fiberglass has been used for many different processes including the manufacture of products such as air filters of the type used in heating and air conditioning systems and asphalt-based roofing systems. One skilled in the art appreciates that the resin referred to in the instant application includes various sizing and binders which may be applied to the glass fibers and products formed therefrom. A certain amount of scrap results in the manufacturing process from nonconforming products, damage, mill ends and the like. Up to now, there has not been an effective and efficient way to remove the resin from the fiberglass. The waste products have been disposed of generally in landfill type environments and amount to a landfill cost of thousands of dollars a day throughout the industry, and the lost opportunity from the re-use of the landfilled materials.

One potential solution to the problem is disclosed in U.S. Pat. No. 4,300,955 to Yount (the "Yount '955 Patent"). The Yount '955 Patent discloses a process for removing resin from resin spun fiberglass of either a continuous or chopped fiber type by passing the resin-coated fiberglass through a treatment tank, removing the glass from the tank, then rinsing any residue therefrom prior to drying, chopping, and recycling the glass into the marketplace. The treatment tank used dye machines that were large tubs filled with phosphoric acid and some with rinse water. The process was adaptable to a large number of types of urea-formaldehyde type resin-coated fiberglass.

The Yount '955 Patent process has three perceived drawbacks. First, the system as proposed is labor intensive, requiring the physical moving of the fiberglass on a screen from the acid bath to a rinsing bath. Second, the system as proposed is sluggish in removing the resin from the fiberglass. Finally, the recovered glass is difficult to reuse in most manufacturing applications. This renders the untreated glass reusable in low value applications such as paving or for use in filters.

It is thus highly desirable to improve the efficiency by proposing a system that is less labor intensive and more efficient in removing resin from the resin-coated fiberglass.

It is also highly desirable to treat the recovered glass so that it may be used in a wide variety of applications such as reinforcement applications.

SUMMARY OF THE INVENTION

The present invention has been developed to provide a method to remove the resin from resin treated fiberglass of either the continuous or chopped fiber type in a more efficient and less labor-intensive process than has previously been developed. This process not only returns virtually one hundred percent of the fiberglass treated to a useable condition, but it also eliminates the cost of disposal as well as the resultant pollution control problems associated therewith.

In accordance with the present invention, the resin-containing fiberglass is passed through a washer/extractor machine that strips the resin from the fiberglass. The washer/extractor machine uses an acid bath to remove the resin from the fiberglass. The fiberglass is then rinsed to remove any residue therefrom prior to drying, chopping, and recycling into the marketplace. The acid and water used in the treatment are separated from the resin using a clarifier. The acid and water are reused in the bath, thereby minimizing waste product. The resin residue may be further processed and used in many other industries, including the fertilizer industry.

In addition, a sizing composition treatment bath may be added to the washer/extractor machine to apply a sizing prior to the dewatering or drying step. The sizing helps to minimize fuzzing and interfilament abrasion that typically occurs with unsized fiberglass fibers. This fuzzing and interfilament abrasion reduces the mechanical properties inherent in the fiberglass.

Other objects and advantages of the present invention will become apparent and obvious from a study of the following description and the accompanying drawing which are merely illustrative of such invention.

DETAILED DESCRIPTION AND PREFERRED EMBODIMENTS OF THE INVENTION

Figure 1:
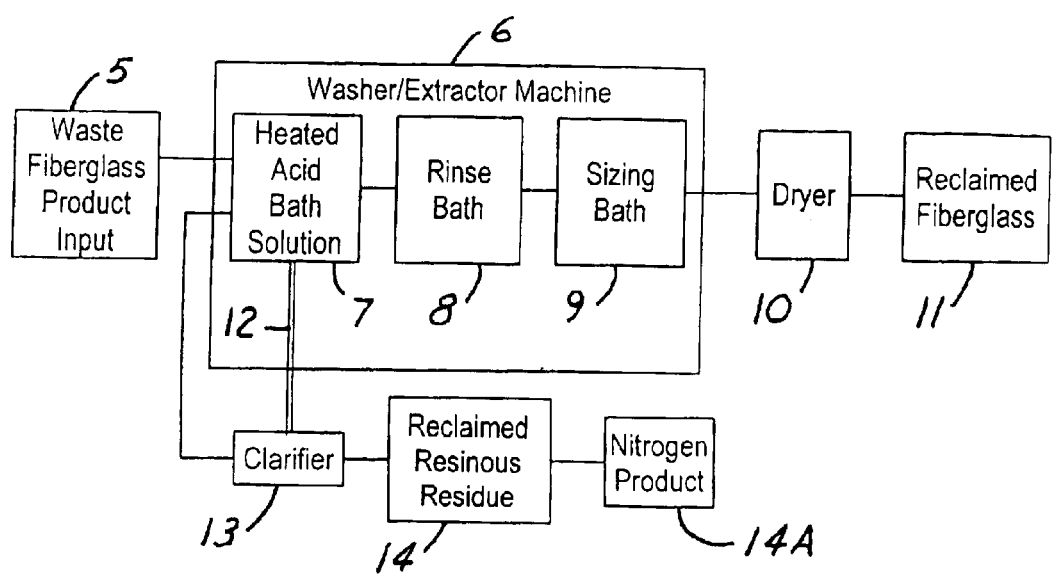
FIG. 1 is a logic flow diagram describing the preferred process for removal of the resin coating from a resin-coated fiberglass and recovery of the fiberglass and nitrogenous product according to a preferred embodiment of the present invention.

Referring now to FIG. 1, a logic flow diagram for recovering reclaimed fiberglass 11 and reclaimed nitrogen product 14A from a resin-coated fiberglass waste product input 5 is disclosed. The waste product input 5 enters a washer/extractor machine 6. The waste product input 5 may be in the form of individual fiberglass strands or as a fiberglass mat, or any other form of coated glass. Further, the waste product input 5 may be other types of strands or mats that are known in the art, including but not limited to carbon fibers, natural fibers, and the like that are not decomposed or otherwise irreparably harmed by the process. The waste product input 5 is first showered with or otherwise introduced to a heated acid bath solution 7 to remove the resinous coating 14 from the fiberglass. The fiberglass is then rinsed in a rinse bath 8 to remove any residual resin and acid. The fiberglass may then be sized with a sizing composition in a sizing bath 9. The sized or unsized fiberglass is dewatered and removed from the washer/extractor machine 6 and dried in a dryer 10 to form the reclaimed fiberglass 11. The dryer 10 is preferably an oven. Alternatively, the reclaimed fiberglass may be dried by alternative means such as spinning (extraction) or other air-drying.

The resinous coating 14 and acid bath solution 7 are cooled in a cooling line 12 that precipitates out the resinous residue 14 from the acid bath solution 7. The resinous residue 14 is then fully removed from acid bath solution 7 in a clarifier 13. The resinous residue 14 may be stored and processed at a later time to form a nitrogen product 14A usable in a number of different industries.

Figure 2:
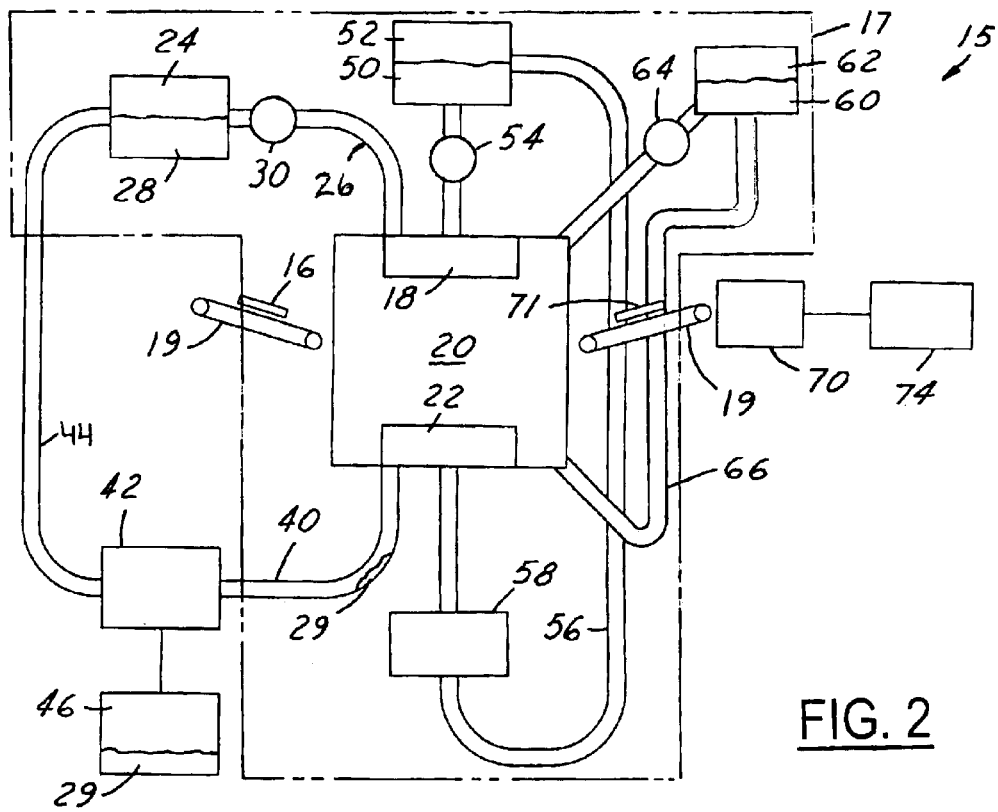
FIG. 2 illustrates one preferred washer/extractor machine that may be used in FIG. 1.
Figure 3:
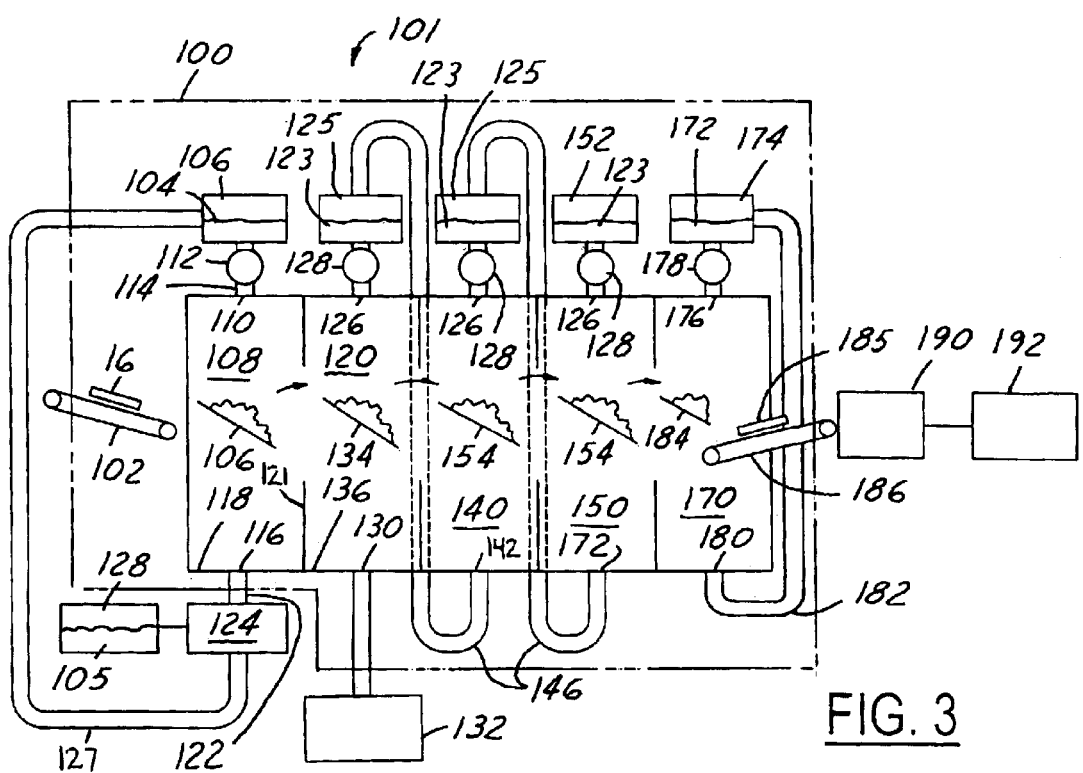
FIG. 3 illustrates another preferred washer/extractor machine that may be used in FIG. 1.

FIGS. 2 and 3 illustrate two preferred washer/extractor machines used to remove the resinous coating from the resin-coated fiberglass waste product input.

Referring now to FIG. 2, one preferred process for removing a resinous coating from a fiberglass product is generally designated as 15. The process 15 begins by introducing a fiberglass waste product 16 such as urea-formaldehyde resin-coated continuous or chopped fiberglass into the main chamber 20 of a single chamber washer/extractor machine 17 via an automated shuttle/conveyor 19. The waste product 16 may be in the form of individual fiberglass strands or as a fiberglass mat. Further, the waste product 16 may be other types of strands or mats that are known in the art, including but not limited to carbon fibers, natural fibers, and the like that are not decomposed or otherwise irreparably harmed by the process 15. The single chamber washer/extractor machine 17 consists essentially of an input area 18, the main chamber 20, and an output area 22.

In the first step, an acid bath solution 28 is introduced from an acid bath chamber 24 to the main chamber 20 through the input area 18. Preferably, this is done using a pump 30. The acid bath solution 28 is preferably a mixture of acid that lowers the pH below 1.0 and preferably comprises between ten percent and fifty percent phosphoric acid ($H_3PO_4$) to water ($H_2O$) that has been heated to approximately 200 degrees Fahrenheit along a heating line 26 between the chamber 24 and the input area 18. Of course, any other suitable acid that lowers the pH to below 1 may be used that is known in the art. The acid bath may include other components to clean the fibers. The acid bath solution 28 showers or is otherwise introduced to the waste product 16 within the chamber 24 until the resinous residue 29 has been removed from the fiberglass fibers. The acid bath solution 28 and resinous residue 29 removed from the fiberglass fibers is removed from the main chamber 24 via the output area 22.

The acid bath solution 28 and resinous residue 29 enters a cooling tube 40 where it is cooled. The resinous residue 29, which is at its saturation concentration, precipitates out of the acid bath solution 28 and is separated from the acid bath solution 28 by a clarifier 42. The acid bath solution 28 is returned to the acid bath chamber 24 via line 44, while the resinous residue 29 is collected into a container 46. The resinous residue 29, depending upon its composition, may be further processed to recover a nitrogenous product that is useful in other industries such as the fertilizer industry. It is estimated that approximately 20 to 30% of the resinous residue 29 in a urea-formaldehyde resin coating removed from fiberglass according to this process contains a usable nitrogenous product. In addition, the recovery of usable nitrogenous product decreases the amount of waste product that is generated in this process. Thus, the process reduces environmental concerns surrounding waste disposal and storage.

Water 50 is then introduced from a water bath chamber 52 to the main chamber 20 through the input area 18 by a pump 54. The water 50 removes any leftover resinous and acid residue from the fiberglass and exits the output area 22. The water is returned to the water bath chamber 52 through line 56. A replaceable filter 58 may be used within to remove any residue from the water 50.

Next, a sizing composition 60 may be introduced from a size chamber 62 to the main chamber 20 through the input area by a pump 64. The sizing composition 60 is a size commonly used in the fiberglass industry. The excess size 60 exits the main chamber 20 through the output area 22 and is returned to the size chamber 62 through line 66.

Finally, the fiberglass product 71, sized or unsized, is dewatered and removed from the single chamber washer/extractor 17 along the conveyor 19 and may be dried in a forced air oven 70. The resin free fibers are then removed from the oven 70 and stored in a storage container 74 for use at a later time. Alternatively, the fibers may be chopped to a preferred length of at least ¼ inch prior to being placed in the storage container. Further, the fibers may be woven or otherwise processed to form a matting material for use in reinforcement applications by methods that are well known in the glass industry.

While not shown, additional steps may be provided in the current process, including a step to cut or chop large pieces of mat or glass before introduction into the chamber. Such cutting of a mat may be performed using a guillotine roll splitter or a rotary or servo sheeter to cut the roll into smaller pieces. Additionally, a step may be provided prior to introduction of the glass into the chamber to wash the glass to remove any contaminants (such as dirt), such cleaning step may include the use of a power washer, or a bath including a detergent and/or a water rinse, and may be performed prior to insertion into the chamber, or may be performed within the chamber. It is specifically further contemplated that the introduction of the acid bath solution 28, water 50, and sizing composition 60 to and from the main chamber 20 may be controlled using a plurality of valves in the input area 18 and output area 22. These valves may be manually controlled by an operator or electronically controlled by an electronic control module in order to automate the system 10 for peak efficiency. This also decreases costs associated with recovery.

In addition, it is contemplated that single chamber extractor/washer machine 17 may contain features designed to remove fumes or vapors that are generated in any of the process. For example the machine 17 could have a hood and/or incinerator (not shown).

In an alternative preferred embodiment, as shown in FIG. 3 as process 101, a multi-chamber extractor/washer 100 may be used in place of the single-chamber washer/extractor 17. The waste product 16 enters the multi-chamber extractor/washer 100 along a conveyor belt 102 and into the first chamber 108. The first chamber 108 contains a perforated scoop 106 on which the waste product 16 is placed.

In the first chamber 108, an acid bath solution 104 is introduced from an acid bath chamber 106 to the first chamber 108 through an input area 110. Preferably, this is done using a pump 112. The composition of acid bath solution 104 is determined based upon the type of resinous coating on the waste product 16 and typically has a very low pH (below 1.0) and is typically heated to enhance the resin removal. For example, for a urea-formaldehyde coated fiberglass waste product 16, the acid bath solution 104 is preferably a mixture of between ten percent and fifty percent phosphoric acid ($H_3PO_4$) to water ($H_2O$) that has been heated to approximately 200 degrees Fahrenheit along a heating line 114 between the first chamber 102 and the input area 110. Other exemplary acids that may be used include hydrochloric acid and acetic acid. The acid bath solution 104 showers or is otherwise introduced to the waste product 16 until the resinous residue 105 has been removed from the fiberglass fibers. The acid bath solution 104 and resinous residue 105 removed from the fiberglass fibers filters through the scoop 106 and is removed from the first chamber 108 via the output area 116. The scoop 106 is lifted out of the bottom area 118 of the first chamber 108 and proceeds to pour the fiberglass fibers into a second chamber 120. A partition 121 separates and seals the first chamber 108 from the second chamber 120.

The acid bath solution 104 and resinous residue 105 exit the output area 116 and enters a cooling tube 122 where it is cooled. The resinous residue 105 precipitates out of solution and is separated from the acid bath solution 104 by a clarifier 124. The acid bath solution 104 is returned to the acid bath chamber 106 via line 127, while the resinous residue 105 is collected into a container 128. As above, the resinous residue 105 may be further processed to yield a nitrogenous product that can be used in a wide variety of other products.

Water 123 is then introduced from a water bath holding tank 125 to the second chamber 120 through the input area 126 by a pump 128. The water 123 removes any leftover resinous and acid residue from the fiberglass and exits the output area 130 into a storage tank 132 for recycling. A perforated scoop 134 holding the fiberglass fibers is lifted from the bottom area 136 and deposits the fibers in the next adjacent chamber 140.

The next adjacent chamber 140 has a similar setup to second chamber 120. As the fiberglass fibers are moved from chambers from left to right, as shown in FIG. 3, a cleaner water solution 123 is introduced to the fibers within each adjacent chamber 140. The water 123 is collected in the output area 142 of each adjacent chamber and returned to the next adjacent holding tank 125 via a line 146. In this way, the fibers are introduced to cleaner and cleaner water solutions within adjacent chambers 140 until they reach final water chamber 150, in which fresh water is introduced from a fresh water tank 152. The number of adjacent chambers 140 may vary from one to several, depending upon the cleaning levels desired.

As with the other chambers, a perforated scoop 154 lifts the fibers out of the final water chamber 150 and places the fibers into a sizing chamber 170. A sizing composition 172 is introduced to the sizing chamber 170 from a sizing tank 174 through input area 176 by pump 178. The sizing composition 172 is a size commonly used in the fiberglass industry. The excess sizing composition 172 exits the sizing chamber 170 through the output area 180 and is returned to the size tank 174 through line 182. A perforated scoop 184 lifts the sized fiberglass fibers out of the sizing chamber 170 and onto a conveyor 186 to exit the machine.

Of course, in alternative embodiments, wherein the addition of a sizing composition 172 to the fiberglass fibers is not desired, the sizing chamber 170 may be replaced by a final rinsing chamber (not shown), or may include additional chambers (not shown) to conduct the additional steps disclosed above.

Finally, the fiberglass product 185, sized or unsized, is dewatered and removed from the washer/extractor 100 along the conveyor 186 and may be dried in a forced air oven 190. The resin free fibers 185 are then removed from the oven 190 and stored in a storage container 192 for use at a later time. Alternatively, the fibers 185 may be chopped to a preferred length of at least ¼ inch prior to being placed in the storage container. Further, the fibers 185 may be used to form a matting material in a method well known in the art in the glass industry.

As with FIG. 2, it is specifically contemplated that the introduction of the acid bath solution 104, water 123, and sizing composition 172 to and from their respective chambers may be controlled using a plurality of valves in their respective input areas and output areas. These valves may be manually controlled by an operator or electronically controlled by an electronic control module in order to fully automate the system 101 for peak efficiency. In addition, it is contemplated that multi-chamber chamber extractor/washer machine 100 may contain features designed to remove fumes or vapors that are generated in any of the process. For example the machine 100 could have a hood and incinerator.

The above invention offers a simple and easy way for reclaiming fiberglass for use in the fiberglass industry. The invention also provides a method for adding a sizing composition to the reclaimed fiberglass that protects the fiber surface and aid in subsequent processing. The invention also provides a method for reducing fuzzing and interfilament abrasion in the reclaimed fiberglass by introducing a sizing composition prior to removal from the washer/extractor machine. The above invention also permits recovery of a nitrogenous product that may be subsequently processed for use in the fertilizer or similar industry while reducing waste products that are typically disposed of in landfills, a product that can create environmental concerns. Finally, the above invention offers an efficient and automated approach to the reclaiming process, thereby improving efficiency and reducing costs.

Furthermore, the fibers reclaimed from the process of the present invention may be used in a number of applications, including forming a wet process mat, for example as described in U.S. Pat. No. 6,251,224 to Dong, which is incorporated herein by reference in its entirety. While not intended to be limited to the bicomponent mat composition or whitewater solution described therein, in such an example, the whitewater slurry of the Dong may be applied to the fibers within (or after) the machine (along with additional fibers or any necessary additives), and the slurry formed therefrom may then be applied to a wire in a known manner to form a wet process mat.

While the invention has been described in terms of preferred embodiments, it will be understood, of course, that the invention is not limited thereto since modifications may be made by those skilled in the art, particularly in light of the foregoing teachings.

What is claimed is:

1. A process for reclaiming fibers from a resinous fibrous product comprising the steps of:
    (a) selecting an acid for use in an acid bath solution as a function of a type of a resinous residue found on the resinous fibrous product;
    (b) inserting the resinous fibrous product into a washer/extractor machine, wherein said resinous fibrous product comprises a form including a strand form and a mat form;
    (c) while said resinous fibrous product is in said machine, performing the steps of:
        (i) introducing said resinous fibrous product to said acid bath solution heated to approximately 200 degrees Fahrenheit for a period of time sufficient to substantially remove said resinous residue from a fiber portion of the resinous fibrous product;
        (ii) removing said acid bath solution and said resinous residue from said washer/extractor machine;
        (iii) rinsing said fiber portion to remove any residual acid bath solution and resinous residue;
    (d) removing said fiber portion from said washer/extractor machine; and
    (e) dewatering said fiber portion.

2. The process of claim 1 further comprising the step of:
(iv) applying a sizing composition to said fiber portion prior to the step of (d) removing said fiber portion from said washer/extractor machine.

3. The process of claim 1 further comprising the step of forming a fiberglass mat from said fiber portion after the stop of dewatering said fiber portion.

4. The process of claim 1, wherein the step of (b) inserting the resinous fibrous product within a washer/extractor machine comprises the step of (b) inserting the resinous fibrous product within a single chamber washer/extractor machine.

5. The process of claim 1, wherein the step of (b) inserting the resinous fibrous product within a washer/extractor machine comprises the step of (b) inserting the resinous fibrous product within an electronically controlled single chamber washer/extractor machine.

6. The process of claim 1, wherein the step of (b) inserting the resinous fibrous product within a washer/extractor machine comprises the step of (b) inserting the resinous fibrous product within a multi-chamber washer/extractor machine.

7. The process of claim 1, wherein the step of (b) inserting the resinous fibrous product within a washer/extractor machine comprises the step of (b) inserting the resinous fibrous product within an electronically controlled multi-chamber washer/extractor machine.

8. The method of claim 1, further comprising the step of (f) drying said fiber portion in an oven.

9. The method of claim 1, wherein the acid bath solution comprises said acid and a quantity of water in a ratio of between ten and fifty percent acid to water by volume.

10. The method of claim 1, wherein said resinous fibrous product comprises glass fibers.

11. The method of claim 1, further comprising the steps of:
forming a slurry comprising said fibers and a binder; and
forming a wet-process mat from said slurry.

12. The method of claim 11, wherein the step of forming said slurry comprises the step of forming a slurry within said washer/extractor machine, said slurry comprising said fibers and a binder.

13. A method for recovering a resinous residue from a resinous fibrous product capable of being further processed into a usable nitrogen product comprising the steps of:
selecting an acid for use in an acid bath solution as a function of a type of the resinous residue found on the resinous fibrous product;
inserting the resinous fibrous product within a washer/extractor machine, wherein the resinous fibrous product is in the form of a plurality of strands or in the form of a mat;
introducing said resinous fibrous product to said acid bath solution heated to approximately 200 degrees Fahrenheit for a period of time sufficient to substantially remove the resinous residue from a fibrous portion of the resinous fibrous product;
removing said acid bath solution and the resinous residue from said washer/extractor machine;
introducing said acid bath solution and the resinous residue into a cooling line to precipitate the resinous residue; and
removing the precipitated resinous residue from said acid bath solution using a clarifier.

14. The process of claim 13, wherein the step of inserting the resinous fibrous product within a washer/extractor machine comprises the step of inserting the resinous fibrous product within a single chamber washer/extractor machine.

15. The process of claim 13, wherein the step of inserting the resinous fibrous product within a washer/extractor machine comprises the step of inserting the resinous fibrous product within an electronically controlled single chamber washer/extractor machine.

16. The process of claim 13, wherein the step of inserting the resinous fibrous product within a washer/extractor machine comprises the step of inserting the resinous fibrous product within a multi-chamber washer/extractor machine.

17. The process of claim 13, wherein the step of inserting the resinous fibrous product within a washer/extractor machine comprises the step of inserting the resinous fibrous product within an electronically-controlled multi-chamber washer/extractor machine.

18. A method for reclaiming fibrous and a resinous residue from a resinous fibrous product in the form of a strand or a mat comprising the steps of:
selecting an acid for use in an acid bath solution as a function of a type of the resinous residue found on the resinous fibrous product;
inserting the resinous fibrous product within a washer/extractor machine;
introducing said resinous fibrous product to said acid bath solution heated to approximately 200 degrees Fahrenheit for a period of time sufficient to substantially remove the resinous residue from a fibrous portion of the resinous fibrous product;
removing said acid bath solution and said resinous residue from said washer/extractor machine;
rinsing said fibrous portion to remove any residual acid bath solution and resinous residue;
removing said fibrous portion from said washer/extractor machine;
dewatering said fibrous portion;
introducing said acid bath solution and said resinous residue into a cooling line to precipitate said resinous residue; and
removing said precipitated resinous residue from said acid bath solution using a clarifier.

19. The process of claim 18, wherein the step of inserting the resinous fibrous product within a washer/extractor machine comprises the step of inserting the resinous fibrous product within an electronically-controlled single-chamber washer/extractor machine.

20. The process of claim 18, wherein the step of inserting the resinous fibrous product within a washer/extractor machine comprises the step of inserting the resinous fibrous product within a multi-chamber washer/extractor machine.

21. The process of claim 18, further comprising the step of drying said fibrous portion in an oven.

22. The process of claim 18, further comprising the step of applying a sizing composition to said fibrous portion prior to the step of removing said fibrous portion from said washer/extractor machine.

23. The process of claim 18, wherein said acid bath solution comprises said acid and a quantity of water in a ratio of between ten and fifty percent acid to water by volume.

24. The process of claim 23, wherein said acid is phosphoric acid.

25. The process of claim 18 further comprising the step of forming a fibrous mat from said fibrous portion after the step of dewatering said fibrous portion.

* * * * *

UNITED STATES PATENT AND TRADEMARK OFFICE
CERTIFICATE OF CORRECTION

PATENT NO. : 6,793,737 B2
DATED : September 21, 2004
INVENTOR(S) : Yount

It is certified that error appears in the above-identified patent and that said Letters Patent is hereby corrected as shown below:

Column 7,
Line 6, "stop" should read -- step --.

Signed and Sealed this

Thirtieth Day of November, 2004

JON W. DUDAS
*Director of the United States Patent and Trademark Office*